Nov. 22, 1966  A. L. MENNESSON  3,286,998
CARBURETORS FOR INTERNAL COMBUSTION ENGINES
Filed Feb. 24, 1964

INVENTOR
ANDRÉ LOUIS MENNESSON
BY Bailey Stephens &
      Huettig
     ATTORNEYS

United States Patent Office 3,286,998
Patented Nov. 22, 1966

3,286,998
CARBURETORS FOR INTERNAL COMBUSTION ENGINES
André Louis Mennesson, Neuilly-sur-Seine, France, assignor to Societe Industrielle de Brevents et d'Etudes S.I.B.E., Neuilly-sur-Seine, France, a society of France
Filed Feb. 24, 1964, Ser. No. 346,863
Claims priority, application France, Mar. 26, 1963, 929,326
3 Claims. (Cl. 261—27)

The present invention relates to carburetors for feeding internal combustion engines with a fuel and air mixture and of the kind wherein the fuel is injected under pressure into the feed pipe or induction pipe of the engine by a pump driven by an electric motor. The present invention is more especially, but not exclusively, concerned with devices of this kind wherein, as disclosed in my United States Patent No. 3,198,498 patented August 3, 1965 for "Pressure Carburetors," the fuel is metered upstream of the pump and independently of the suction action thereof, this pump being fed from a chamber wherein is collected the fuel preliminarily metered by its flow through an orifice of a cross section proportional to the cross section of a given portion of the induction pipe through which air is fed.

The injection pump is driven by an electric motor, and not by the internal combustion engine, either because it is desired to drive the pump at a relatively constant speed, or because it would be difficult to provide a mechanical connection between the internal combustion engine and the pump. As a rule, the energizing circuit of the electric motor is closed at the same time as the ignition circuit of the internal combustion engine. It may thus happen that the pump is started when the fuel metering device is not in action, and, in these conditions, the pump rotates without feeding liquid, which may result in deterioration thereof after a time.

The object of the present invention is to provide a feed device of the above mentioned kind which does not present the above stated drawback.

For this purpose, according to the present invention, means are provided for automatically starting or stopping the pump electric motor, in particular by closing or opening its energizing circuit, according as the flow rate of air in the induction pipe is below or above a given limit, respectively.

A preferred embodiment of the present invention will be hereinafter described with reference to the appended drawing, given merely by way of example, and in which.

Figure 1:
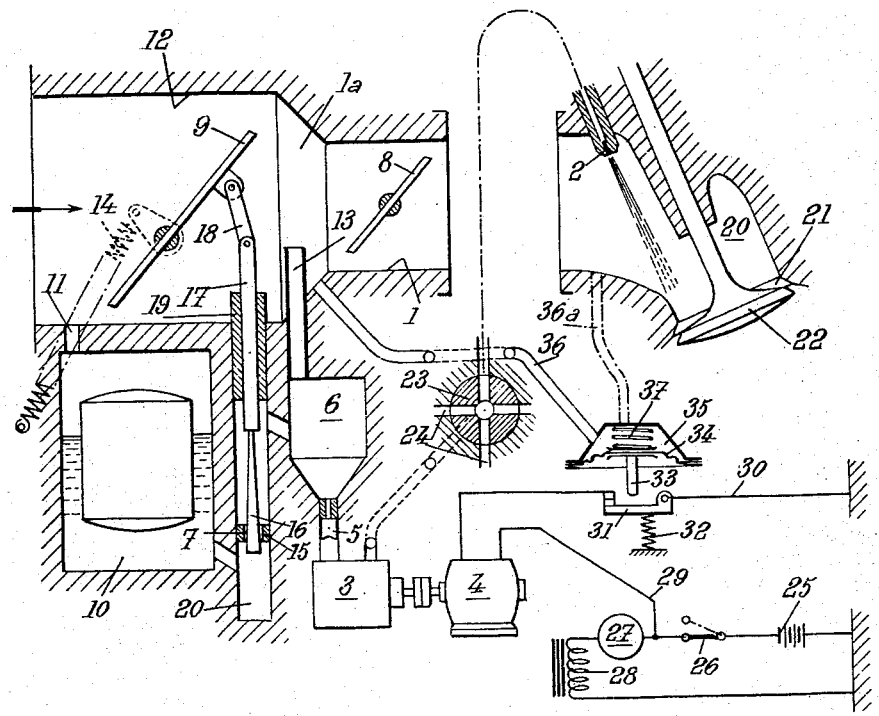
FIG. 1 is a diagrammatic vertical sectional view of a carburetor made according to the present invention.

It is desired to provide a carburetor for injecting under pressure fuel into the induction pipe 1 of an internal combustion engine through at least one injection orifice 2 fed with fuel from a pump 3, this pump being driven by an electric motor 4.

Concerning the general arrangement with the exception of electric motor 4, it is made as described in the above mentioned prior application. For this purpose, pump 3 which does not serve to meter fuel but is provided merely to supply the injection pressure, collects through a conduit 5, fuel from a chamber 6. Fuel is fed to said chamber, under a pressure difference substantially equal to that to which air is subjected in a portion 1a of pipe 1, through a passage 7 of variable cross section proportional to that of the upstream end of said pipe portion. The whole is arranged in such manner that the pressure in chamber 6 is kept at the same value as the pressure in pipe portion 1a, independently of the conditions of operation of pump 3.

Portion 1a of induction pipe 1 is limited on the downstream side by a throttle valve 8 controlled by the driver and on the upstream side by a throttling member 9 automatically controlled so that the pressure existing in pipe portion 1a is substantially constant or varies according to a given law as a function of the air flow rate through pipe 1. Throttling member 9 controls the cross section of fuel passage 7, located between a constant level chamber 10 (connected through an orifice 11 to the air inlet 12 of pipe 1) and chamber 6 communicating through a conduit 13 with the portion 1a of pipe 1 so that the pressure in said chamber 6 is the same as the pressure in pipe portion 1a. Advantageously the air inlet 12 of pipe 1 is connected to a suction filter or damper.

Throttling member 9 consists of an eccentrically pivoted shutter arranged so that the suction produced by the internal combustion engine tends to open it against the action of a spring 14. Throttling member 9 might of course be made in any other way as indicated in said prior patent application.

It is known that the cross section of the air flow passage limited by throttling member 9 in induction pipe 1 is such that the suction in pipe portion 1a is substantially constant or follows a given law in response to the variation of the air flow rate. This suction depends essentially upon the characteristics of spring 14 and secondarily upon the amount of eccentricity of shutter 9.

The flow passage through passage 7 is given an annular shape limited by a calibrated orifice 15 and a movable needle 16 of non cylindrical, and for instance of substantial conical shape. This needle is displaced axially in orifice 15 by eccentric shutter 9 through a rod 17 rigid with needle 16, and connected with shutter 9 by means of a link 18. Rod 17 is guided by a sleeve 19 so as to permit the passage of said rod through the wall of pipe 1 in a substantially fluid-tight manner. Orifice 15 is located in a chamber 20 which communicates, upstream of said orifice, with constant level chamber 10, and, downstream of said orifice, with chamber 6.

The inflow of pump 3 is connected with the bottom of chamber 6. This pump 3, which does not serve to meter the fuel, may be of any type whatever (for instance a centrifugal pump or a volumetric pump).

Injection orifice 2 is advantageously disposed, as shown, in such manner as to feed fuel in the vicinity of the inlet orifice 21 of the corresponding cylinder of the internal combustion engine. This orifice 21 is controlled by a valve 22 or the like.

In the case of an engine involving several cylinders, where at least one injection orifice 2 is associated with every cylinder, there is of course interposed a distributing device 23 between pump 3 and the injection orifices in question, in such manner as to distribute the fuel delivered by the pump to the engine cylinders through conduits 24.

Concerning now electric motor 4, it is fed from the battery 25 of the internal combustion engine ignition circuit, this circuit being diagrammatically indicated by ignition contactor 26, circuit breaker 27 and the primary winding 28 of the ignition coil. The feed circuit of motor 4 is connected to one of the terminals of battery 25 through a conductor 29 branched downstream of contactor 26 and to the other terminal of said battery, for instance through the earth, through a conductor 30.

Now, according to the present invention, means are provided for acting, when contactor 26 closes the ignition circuit, so as automatically to bring electric motor 4 out of action or into action, according as the air flow rate in pipe 1 is below or above a given limit, which is lower than the value corresponding to the idling of the engine or to the driving of said engine by the conventional starter.

Advantageously, this air flow rate is measured by the suction existing in pipe 1 downstream of shutter 9, and preferably in the portion 1a of said pipe extending between throttle valve 8 and throttling member 9.

For this purpose, in the embodiment shown by the drawing, conductor 30 includes a movable member 31 urged by a spring 32 toward the contact closing position shown by FIG. 1, this member 31 being operated by a control finger 33 carried by a diaphragm 34. This diaphragm 34 constitutes one of the walls of a chamber 35 communicating with the portion 1a of induction pipe 1 through a conduit 36. A spring 37 urges diaphragm 34 downwardly. The system is such that, in the absence of a suction in chamber 35 (FIG. 2), spring 37 pushes finger 33 against movable member 31 and, overcoming the action of spring 32, brings member 31 into the position where it cuts off conductor 30. When a sufficient suction is produced in chamber 35, finger 33 is pulled in and movable member 31 is returned by spring 32 into the position (FIG. 1) where it closes the circuit of conductor 30.

By way of modification, chamber 35 might be connected through conduit 36a to a portion of pipe 1 located downstream of throttle valve 8.

Figure 2:
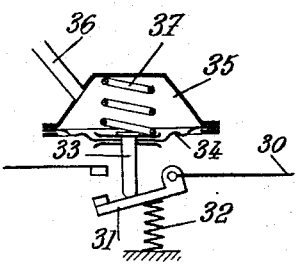
FIG. 2 shows, on an enlarged scale, a detail of FIG. 1 in another position of operation.

Whatever be the embodiment that is chosen, the feed device above described works as follows:

When the internal combustion engine is to be started, the parts are in the position of FIG. 2. As a matter of fact, there is no suction exerted in pipe 1 so that conductor 30 is cut off by movable member 31. Whatever be the position of ignition conductor 26, motor 4 is not energized and pump 3 is not operated.

On the contrary, as soon as the engine is driven by the starter or rotates by itself, a suction is provided downstream of throttling member 9 and is transmitted through chamber 35 so as to pull in finger 33, as shown by FIG. 1. The energizing circuit of motor 4 is then closed and this motor is started and drives pump 3.

It should be noted that, whatever be the speed at which the internal combustion engine is driven by the starter, the suction produced between throttle valve 8 and throttling member 9 is substantially constant and has a non negligible value, so that diaphragm 34 is not required to be very sensitive to suction variations and spring 37 may have a sufficient force, in particular to overcome that of spring 32.

It is known that the flow rate of air through pipe 1 determines the angular position of shutter 9, that is to say the cross section of passage 7 through which fuel is sucked in from constant level chamber 10 to chamber 6. Thus the flow rate of fuel reaching said chamber 6 is always adapted to said air flow rate and pump 3 acts only to discharge this fuel into induction pipe 1.

As soon as pump 3 starts working under the effect of the suction existing in the induction pipe downstream of shutter 9, it is this suction which produces the flow of fuel into chamber 6 so that the pump is automatically started. Thus there is no danger of pump 3 running when dry, that is to say when it is not delivering fuel, which prevents an abnormal heating of said pump.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. An internal combustion engine carburetor which comprises, in combination, an air induction pipe leading to the engine to be fed by the carburetor, valve means for controlling the air flow through said induction pipe, means forming a fuel injection orifice opening into said induction pipe, a fuel chamber, means fixed with respect to said induction pipe forming a fuel receiver in communication with said fuel chamber, means for metering the amount of fuel passing from said fuel chamber to said fuel receiver in accordance with the air flow rate through said induction pipe, a pump located downstream of said fuel receiver for forcing fuel therefrom to said fuel injection orifice, an electric motor operatively connected with said pump for driving it, and means responsive to the pressure in said induction pipe for stopping said electric motor when said pressure is substantially the atmospheric pressure.

2. A carburetor device according to claim 1 comprising a feed circuit for said electric motor, said control means being adapted to open said circuit when said pressure is substantially the atmospheric pressure.

3. An internal combustion engine carburetor which comprises, in combination, an induction air pipe leading to the engine to be fed by the carburetor, means forming a fuel injection orifice opening into said air pipe, a throttle valve in said air pipe upstream of said fuel injection orifice, throttling means movably mounted in said induction pipe upstream of said throttle valve, so that an induction pipe portion is limited between said throttling means and said throttle valve, means responsive to the air pressure difference between the upstream and downstream sides of said throttling means for automatically controlling the position of said throttling means in accordance with said pressure difference, means fixed with respect to said air pipe forming a fuel receiver, a fuel passage opening into said fuel receiver, fuel metering means in said fuel passage including a part fixed with respect to said air pipe and a movable part operatively connected with said throttling means so as to determine in said fuel passage, a portion having a variable cross section area proportional to that of the air passage controlled by said throttling means in said induction pipe, means for feeding said fuel passage with fuel under a pressure equal to the air pressure in said induction pipe upstream of said throttling means, a vent conduit between the top of said fuel receiver and a point of said induction pipe downstream of said throttling means, a conduit leading from the bottom part of said receiver to a point of said induction pipe downstream of said throttle valve, a pump mounted in said conduit to force fuel from the bottom part of said fuel receiver to said fuel injection orifice opening into said induction pipe, an electric motor operatively connected with said pump for driving it, and means responsive to the pressure in said induction pipe for stopping said electric motor when said pressure is substantially the atmospheric pressure.

References Cited by the Examiner
UNITED STATES PATENTS

| | | | |
|---|---|---|---|
| 1,273,356 | 7/1918 | Good | 261—149 |
| 1,402,749 | 1/1922 | Du Pont | 261—50 |
| 2,308,746 | 1/1943 | Flint | 123—139 |
| 2,985,160 | 5/1961 | Armstrong | 261—69 |
| 3,005,625 | 10/1961 | Holley | 261—69 |

FOREIGN PATENTS 1,161,167   3/1961   France.

HARRY B. THORNTON, *Primary Examiner.*

T. R. MILES, *Assistant Examiner.*